Aug. 12, 1958  J. B. FLEMING  2,847,032
RELIEF VALVE FOR PRESSURE MEASURING APPARATUS
Filed Feb. 25, 1955  2 Sheets-Sheet 1

INVENTOR.
JONATHAN B. FLEMING
BY
ATTORNEY

Aug. 12, 1958  J. B. FLEMING  2,847,032
RELIEF VALVE FOR PRESSURE MEASURING APPARATUS
Filed Feb. 25, 1955  2 Sheets-Sheet 2

INVENTOR.
JONATHAN B. FLEMING
BY
Raymond W. Junkins
ATTORNEY

2,847,032
RELIEF VALVE FOR PRESSURE MEASURING APPARATUS

Jonathan B. Fleming, Wickliffe, Ohio, assignor to Bailey Meter Company, a corporation of Delaware Application February 25, 1955, Serial No. 490,526

8 Claims. (Cl. 137—785)

The present invention relates to valving mechanisms utilized in connection with pressure measuring apparatus.

The pressures measured will be those characterized as the differentials between two variable pressures. Even when the value of a negative or of a positive static pressure is to be determined, it is desirably with reference to the pressure of the ambient atmosphere. A common illustration of useful differential is that of pressures across an orifice or other restriction of fluid flow which bear a known relation to the rate of fluid flow through the orifice or restriction. It is apparent then that all measurement of fluid pressures is in fact a comparison of pressure or, in other words, a measurement of a differential pressure.

Numerous specific types of pressure differential measuring apparatus are known. Bourdon tubes, liquid sealed U-tube manometers, diaphragms, bellows and pistons are included in these apparatus as movable wall elements which form a specific element to which the pressures are applied. The present invention is directed to a means for valving between the opposite sides of the movable wall of chambers formed by these elements.

The movement of the walls of measuring apparatus may be partly resisted by the inherent spring characteristics of the wall or, in part, by additional loading from springs or other sources of force. These walls are designed to have a maximum movement or change in position for a maximum change in differential pressure. If the differential pressure applied to the chamber of the movable wall is greater than the designed maximum, there is danger of distortion or rupture of the movable wall. Expansion of a bellows, for example, to a pressure materially in excess of the value for which it is designed, will result in permanent distortion or rupture. The present invention now provides a construction for passing fluid through the movable wall, of which the bellows is an example, when the pressure of the fluid reaches a predetermined maximum, in order to prevent damage to the expansible element.

A general object of the invention is to provide a construction arranged to relieve, or reduce, the differential pressure across a movable wall when the differential pressure exceeds a predetermined value.

Another object of the invention may be said to provide a construction to relieve, or reduce, the differential pressure across a movable wall when a predetermined position has been taken by the movable wall against a constant force, as evidence of excessive differential pressure.

Another object of the invention is to provide a valve which will relieve a differential pressure across a movable wall regardless of which of the two pressures of the differential becomes excessive.

Another object of the invention is to provide a valve structure which is operated to relieve an excess differential pressure across a movable wall by the movable wall operating the valve structure against a fixed reference in one direction when a first pressure of the differential predominates and directly operating valve structure when the second pressure of the differential predominates.

Figure 1:
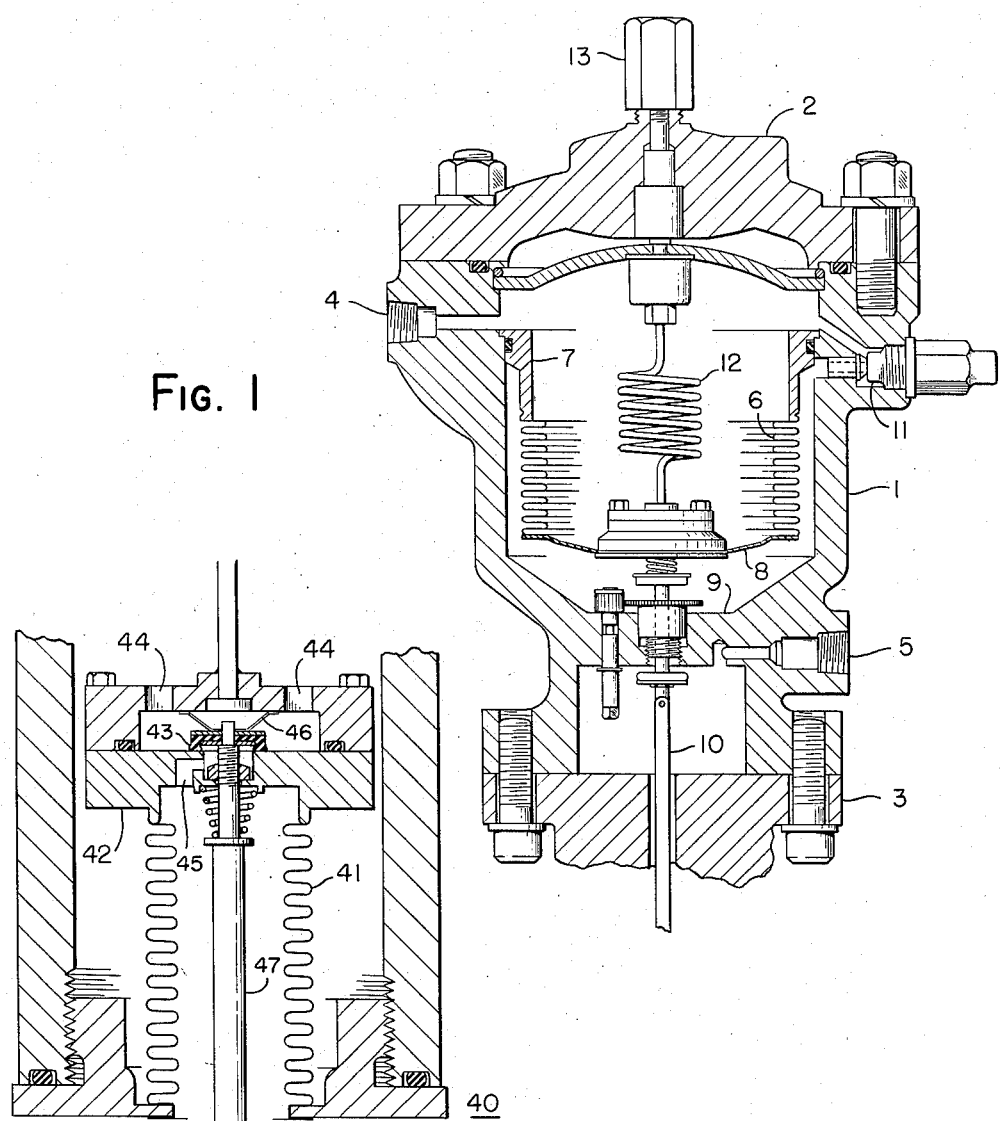
Fig. 1 is a sectional elevation of a measuring apparatus including the structure of the invention.

In Fig. 1 a cylindrical pressure casing 1 is shown with a top cover 2 and a bottom cover 3. High pressure inlet 4 and low pressure inlet 5 penetrate to the interior of casing 1 on opposite sides of bellows 6. As an embodiment of the choice of movable wall elements available, bellows 6 is given the length and flexibility to produce the motion of the desired amount in response to expected ranges of differential pressures.

Bellows 6 becomes the central structure of this measuring apparatus, and is clearly illustrated as specifically mounted on a flange member 7, directly below the high pressure inlet 4. As end plate 8 completes the normal isolation of the two inlets from each other, it is in association with end plate 8 that the essential elements of this preferred embodiment of the valve structure are depicted in the details of the Fig. 2 sectional elevation.

Casing wall 9 is to be noted as a further division of casing 1 into two sections below bellows 6. Note that mechanical motion linkage, terminating with transmitting link 10, extends through an opening in wall 9 in order to take the motion of bellows 6 from casing 1 through bottom cover 3 to a choice of the various forms of mechanical, pneumatic, electrical, etc., manifesting devices that may be controlled from this motion, the usual pressure-sealing being provided. None of the various forms of the manifesting devices are shown in this present disclosure, they being understood as having well known forms which may be mounted in association with bottom cover 3.

There are secondary features disclosed in Fig. 1 which may assist in understanding the operation of this form of measuring apparatus. Equalizing valve 11 can be backed from its seat to give relatively unrestricted communication across bellows 6. Tension spring 12 offers a substantially uniform force against which a difference between the high and low pressure positions the bellows 6. A structure for making an external adjustment of the tension of this spring is characterized by adjustment nut 13, mounted on top cover 2. These features provide the adjustments required for the calibration of the meter prior to placing it in service.

Downward travel of the lower end of bellows 6 is mechanically limited by contact with casing wall 9, or the stop structure mounted on the wall. Upward travel of the lower end of bellows 6 is also mechanically limited by link structure, connected to the end, carrying an abutment which contacts casing wall 9. However, the mere fact that travel of the bellows is mechanically limited in travel does not protect bellows 6 from damage or rupture if the bellows is subjected to an excessive value of differential. As indicated in the stated objects, it is an important feature of my present invention to provide means for relieving the pressure difference, between the interior and exterior of bellows 6, in either direction, when the pressure difference exceeds a predetermined maximum value.

Figure 2:
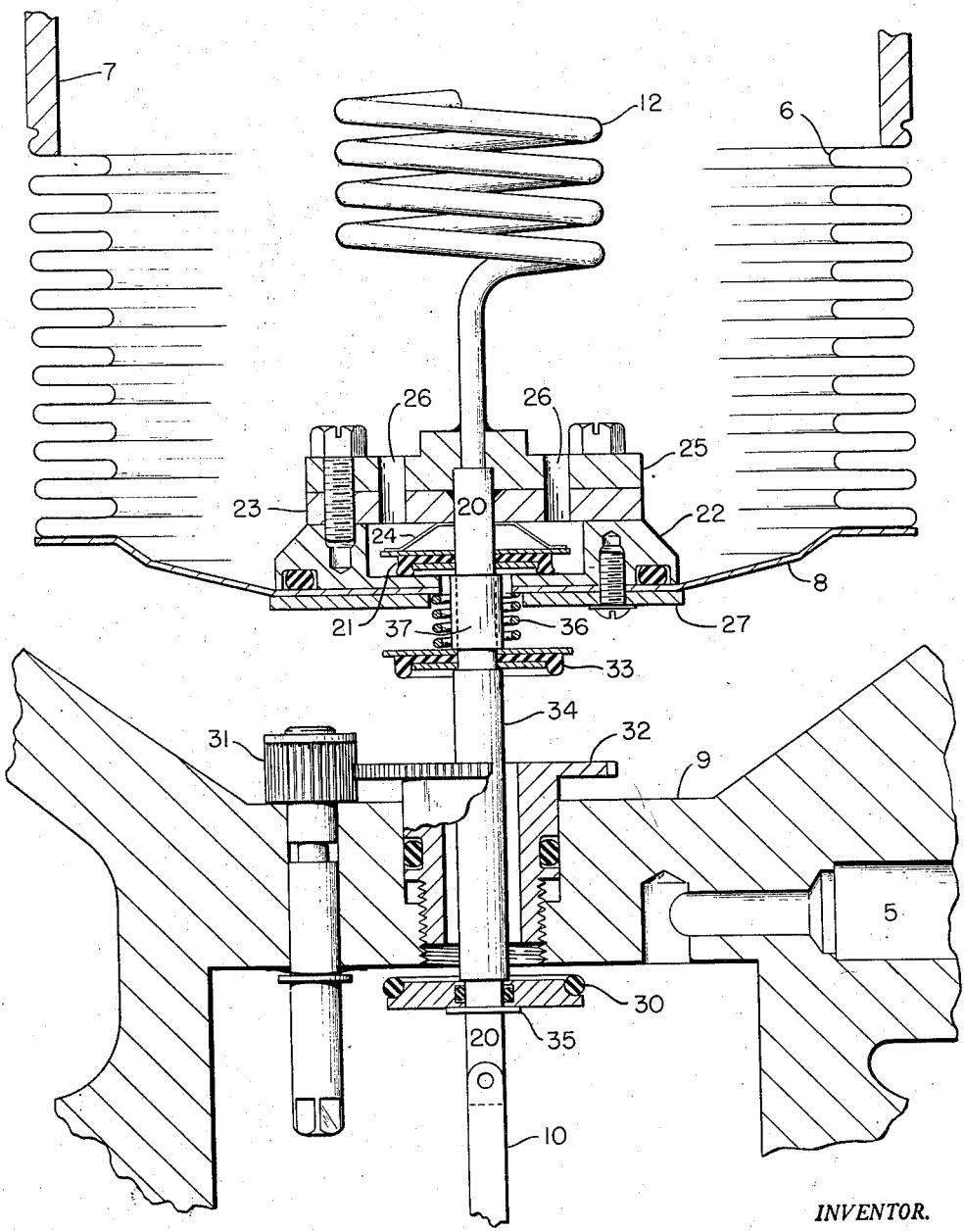
Fig. 2 is an enlarged section of a portion of the measuring apparatus of Fig. 1 and the preferred embodiment of the invention located in the movable wall of the measuring apparatus.

In Fig. 2, a greatly enlarged illustration of a portion of bellows flange 7, bellows 6, bellows end plate 8, casing wall 9, low pressure inlet 5 and a portion of tension spring 12 are shown. A portion of transmitting link 10 is shown in this view, as part of the mechanical motion transmission system from bellows 6. The fundamental operation of the meter begins with the up-and-down motion of connecting link 20, by bellows 6, to finally produce an external manifestation of the value of the differential pressure applied to bellows 6.

The position of the various elements of Fig. 2 are shown in normal operation of the meter. Bellows end plate 8 is shown above, and separated from, casing wall 9, and the limit stop structure mounted thereon. The valve structure is shown as positioned to seal between, or isolate, the high and low pressures across bellows 6 in order that their differentials will move bellows end plate 8, connecting link 20 and transmitting link 10, against the force of spring 12. An understanding of the function of the valve structure during this normal period begins with noting that relief valve 21 is engaged with its seating surface on the interior of relief valve housing 22. A normal seal is, specifically, maintained between the interior and exterior of bellows 6.

Connecting link 20 extends through a hole in the center of circular relief valve member 21. To withstand the severe service of actuation under high values of differential pressures, the active valving surface of member 21 is provided by a disk-shaped body of resilient material sandwiched between metallic discs. The three elements of the valve are held together, by a spring on one side and by structure arranged on the link 20 on the other side.

Besides being formed centrally about link 20, valve 21 is also in a chamber formed within relief valve housing 22. Circular plate 23, above housing 22 is centrally attached to connecting link 20 as it extends up through a central hole in the bottom of housing 22, completing an internal chamber. A relief valve spring 24 normally bears on the underside of plate 23 to hold valve 21 engaged with its seating surface, about link 20 and on the interior wall of housing 22.

The primary object of the invention is accomplished when valve member 21 is moved upwardly against the force of spring 24. Relatively free communication is then provided between the interior and exterior of bellows 6. Of course, access to the valve housing must be provided, and this is accomplished, from the interior, through holes 26. Central holes are provided on the lower portion of housing 22, through end plate 8 and support plate 27, to form an annular passage about link 20 for the relatively free communication between the internal chamber of relief valve 21 and the exterior of bellows 6.

The assembly of plates 23, 25 and housing 22 is bolted together by the studs shown extending downwardly from the interior of bellows 6. The assembly is then permanently secured to bellows end plate 8 by studs extending upwardly from the exterior of bellows 6. Support plate 27 is an example of structure which, with end plate 8, provides a body of sufficient strength, on this section of the bellows, to carry the assembly.

It is appreciated that an increasing exterior pressure of bellows 6 may collapse that expansible member until end plate 8 is taken to a predetermined upper limit of travel. This limit is determined by fixing seal member 30 to link 20, as it extends to the underside of dividing wall 9, so it will seat about the access hole through wall 9. Should this valve 30 leak and allow the pressure on the exterior of bellows 6 to continue building up to, and past, a predetermined allowable maximum, the force built up on the underside of relief valve member 21 will directly oppose the force of relief valve spring 24, lifting the valve from its seat and relieving the excess of pressure to the interior of bellows 6. The more likely over-pressure will occur from within the bellows 6, however, and actuating structure for relief valve member 21 is provided when this anticipated malfunction develops.

Note that adjusting pinion 31 may be rotated manually and is geared to overtravel stop member 32. A central passage through stop member 32 freely accommodates connecting link 20, and its structure, specifically providing the unrestricted communication through casing wall 9. Member 32 is threaded into a tapped hole in wall 9 and provides a valve-seating surface on its upper end which is spaced from wall 9 by the rotation of adjusting pinion 31. The vertical adjustment of this valve seat determines the lower limit of travel for bellows 6.

Seal 33 is carried by link-rod 20 and makes contact with the upper surface of member 32 as the increasing differential of bellows 6 moves bellows, housing and rod downward. Spacer sleeve 34, slides along connecting link-rod 20 to provide abutments which fix the normal distance between lower limit seal 33 and upper limit seal 30. Collar 35 is fixed to link 20 to abut on the underside of seal 30. Thus seals 30 and 33 are held a spaced distance apart by spacer 34, the combination being held together by the force of spring 36 as it is held in compression from the underside of end plate 8.

The specific components, and their arrangements, of seal 33 are patterned after those of valve 21. The severe service calls for this arrangement of all the parts being carried directly on the link-rod 20. With upper limit seal 30 the service is not so severe. A relatively simple sealing function is provided, by a single circular disc, with O-rings at its periphery and center.

The actuating structure for relief valve member 21 is completed by locating operating sleeve 37 between valve 21 and seal 33. It can be appreciated that as bellows 6 expands, under the increasing differential pressure and against the force of spring 12, it moves seal 33 down to seat on over-travel stop member 32. Further increase in the differential pressure will move the end of bellows 6, and relief valve housing 22, down until relief valve 21 unseats by having its seat in housing 22 moved away from it against the force of spring 24 and spring 12. Pressure will then relieve by fluid moving from the interior of bellows 6, through holes 26, to the interior of housing 22 and through the annular, and aligned, holes in the bottom of housing 22 and plates 8 and 27. Thus, excess differential will be relieved, through the end plate 8 of bellows 6, regardless of whether the excess pressure of the differential occurs inside or outside of bellows 6.

Note is to be taken that during the period of operation defined as normal, excess pressure occurring inside of bellows 6, the predominate pressure tends to seat valve 21. Spring 24, initially, acts to urge the valve 21 on to its seat against the friction developed with the surface of connecting link 20. During normal operation the internal pressure of bellows 6 also assists in seating valve 21, and, in unseating valve 21, the spring and fluid pressure seating forces are overcome by the fluid pressure force developed on the remaining portion of the bellows end plate 8. Another factor in the design of spring 24 is the strength needed to establish the external fluid pressure on the bellows at which valve 21 will be lifted from its seat.

Figure 3:
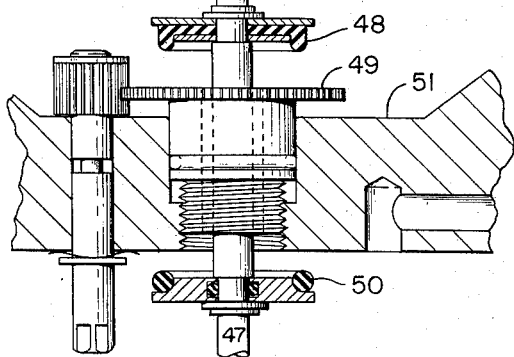
Fig. 3 is a sectional elevation of another form of measuring apparatus and another embodiment of the invention.

Turning finally, to Fig. 3, an embodiment of the relief valve structure is illustrated in association with a bellows fixed, by its lower end, to the casing. This embodiment has utility at least where the bellows is so small that it is impractical to utilize the invention in the form disclosed in Fig. 2. However, the principles of valve actuation, by fluid pressure in one direction and mechanical movement in the other direction, are also employed in this second embodiment.

A meter casing is not shown in the disclosure of Fig. 3 but a compound flange member 40 is illustrated and to be taken as fixed to the interior of a meter casing for completion of separation between the high and low pressures, of the differentials, as introduced into the casing. Bellows 41 is attached to flange structure 40 at its lower end and positions the assembly of housing 42 with its upper end. Relief valve 43 is carried within an interior chamber of housing 42. Passages 44 and 45 provide access from the interior and exterior of bellows 41 to the valve chamber of housing 42. Spring 46 normally maintains valve 43 on its seating surface of the interior chamber of housing 42, about passage 45.

Operation of the relief valve is fundamentally as disclosed in Fig. 2, despite the somewhat different arrangement of cooperating elements. Upon increase of pressures exterior of bellows 41, housing 42 is lowered until connecting link-rod 47 has carried seal 48 into contact with its seat on adjustable stop member 49. Excessive values of pressure exterior of the bellows will then move housing 42 a sufficient distance downward to cause valve 43 to be separated from its seat by housing 42 moving away from the valve 43 as it is restrained by a shoulder formed on connecting link 47. The opening of valve 43 will relieve the pressure exterior of the bellows through passage 44, the interior valve chamber of housing 42 and passage 45.

When the pressure increases interior of bellows 41, housing 42 is taken to its upper limit, predetermined by the position of seal 50, on link-rod 47, seating on the under side of wall 51. Should excess pressure occur beneath valve 43, due to leakage of seal 50, as an example, the force of spring 46 will be overcome and valve 43 separated from its seat to relieve the overpressure internal of bellows 41 through passage 45, the valve chamber interior of housing 42 and passages 44.

What I claim as new, and desire to secure by Letters Patent of the United States, is:

1. A relief valve system for a meter responsive to differential pressure including, in combination, a casing for receiving the pressures of the differential, a pressure responsive wall dividing the casing, a valve housing mounted on the responsive wall and providing an internal chamber with a first passage opening to one side of the wall and a second passage registering with an opening in the wall to the other side, a connecting rod fixed to the housing and extending into the internal chamber, a valve member in the housing slidable along the rod in seating on the internal surface of the housing over the first passage opening to the one side of the wall, a spring within the internal chamber to urge the valve on to its seat, a rigid wall member dividing the casing below the pressure responsive wall and accommodating the connecting rod loosely through an aperture, a first seal member for the rigid wall aperture between the rigid wall and the pressure responsive wall and slideable on the connecting rod, and an actuating sleeve between the first seal member and the valve and which extends into the internal chamber of the housing to lift the valve from its seat after the seal member contacts the rigid wall and the housing continues to move toward the rigid wall.

2. The combination of claim 1 including a manually adjustable seat portion in the rigid wall which the first seal member contacts as the connecting rod is moved through the rigid wall by the pressure responsive wall moving toward the rigid wall.

3. The combination of claim 2 including a spring between the housing and first seal member determining the value of the pressure of the differential which will move the internal seat of the housing toward the wall away from the valve.

4. The combination of claim 3 including a second seal member on the portion of the connecting rod extending through the rigid wall on its side away from the valve housing and arranged to seal the aperture in the rigid wall about the rod and establish the limit of travel as the rod is withdrawn through the rigid wall by the pressure responsive wall moving away from the rigid wall.

5. A valve for a member responsive to differential pressure, including in combination, a casing divided by the responsive member, a valve housing mounted on the responsive member and having an internal chamber with a first passage opening to one side of the member and a second passage opening to the other side by registering with an opening in the member, a rod member fixed to the housing and centrally arranged in one passage, a valve member arranged in the housing and mounted about the rod for sliding movement thereon in seating on the internal surface of the housing and over the passage in which the rod member is centrally arranged, a spring arranged within the internal chamber to urge the valve onto its seat, a rigid wall dividing the casing on one side of the responsive member and receiving the rod through an aperture, and an abutment member fixed to the rod for restricting longitudinal movement of the rod in one direction by contacting the rigid wall.

6. The combination of claim 5 including a second abutment member fixed to the rod and contacting the rigid wall when the rod moves in the other direction to separate the valve and seat.

7. The combination of claim 6 wherein each abutment member includes structure to positively seal the aperture in the rigid wall upon contact.

8. The combination of claim 7 including a spring between the housing and the second abutment.

References Cited in the file of this patent

UNITED STATES PATENTS 2,288,882    Binkley _____ July 7, 1942

FOREIGN PATENTS 389,157    Germany _____ Feb. 1, 1924